United States Patent [19]
Araya

[11] Patent Number: 5,772,979
[45] Date of Patent: Jun. 30, 1998

[54] ALUMINOSILICATES

[75] Inventor: Abraham Araya, Wirral, United Kingdom

[73] Assignee: Crossfield Limited, Warrington, England

[21] Appl. No.: 693,104

[22] PCT Filed: Jan. 11, 1995

[86] PCT No.: PCT/EP95/00103

§ 371 Date: Dec. 19, 1996

§ 102(e) Date: Dec. 19, 1996

[87] PCT Pub. No.: WO95/21125

PCT Pub. Date: Aug. 10, 1995

[30] Foreign Application Priority Data

Feb. 4, 1994 [GB] United Kingdom ............... 9402160

[51] Int. Cl.$^6$ .................................................. C01B 39/02
[52] U.S. Cl. .................. 423/700; 423/709; 423/710; 423/711; 423/328.2; 423/330.1; 423/333
[58] Field of Search ............................ 423/328.1, 328.2, 423/330.1, 332, 333, 700, 709, 710, 711

[56] References Cited

U.S. PATENT DOCUMENTS

| 4,263,266 | 4/1981 | Michel et al. ......................... 423/700 |
| 4,267,158 | 5/1981 | Christophliemk et al. .......... 423/328.1 |
| 4,919,908 | 4/1990 | Blom ..................................... 428/328.2 |
| 4,929,431 | 5/1990 | Hagiwara et al. ................... 423/328.1 |
| 5,089,243 | 2/1992 | Thome et al. ......................... 423/328 |
| 5,236,680 | 8/1993 | Nakazawa et al. .................. 423/328.1 |
| 5,338,528 | 8/1994 | Sorensson et al. ..................... 423/333 |
| 5,346,681 | 9/1994 | Pachaly et al. ...................... 423/328.1 |
| 5,362,466 | 11/1994 | Araya ................................... 423/328.1 |
| 5,512,266 | 4/1996 | Brown et al. ........................... 423/700 |
| 5,560,829 | 10/1996 | Adams et al. ........................... 210/687 |
| 5,616,310 | 4/1997 | Edwards et al. ....................... 423/700 |
| 5,645,811 | 7/1997 | Kuhm et al. ........................... 423/700 |

FOREIGN PATENT DOCUMENTS

| 384070 | 8/1990 | European Pat. Off. . |
| 565364 | 10/1993 | European Pat. Off. . |
| 2256720 | 11/1987 | Japan . |

*Primary Examiner*—Mark L. Bell
*Assistant Examiner*—Louis M. Troilo
*Attorney, Agent, or Firm*—Pillsbury Madison & Sutro LLP

[57] ABSTRACT

Process for manufacturing an alkali metal aluminosilicate of zeolite wherein zeolite P seeds are produced in situ in a first reacting gel with a $SiO_2/Al_2O_3$ ratio of above 2.2 and it is only after the formation of zeolite P seeds, but before said seeds have the time to fully grow, that sodium aluminate is added in order to get a gel which can have a $SiO_2/Al_2O_3$ ratio of about 2 which therefore enables producing a zeolite P having also a $SiO_2/Al_2O_3$ ratio of about 2.

2 Claims, No Drawings

ALUMINOSILICATES

This application claims benefit of international application PCT/EP95/00103, filed Jan. 11, 1995.

FIELD OF THE INVENTION

The invention describes the preparation of alkali metal aluminosilicates, in particular crystalline aluminosilicates having the P-structure. These materials are of value as a component in detergent formulations in which they remove calcium and magnesium hardness ions by ion exchange. They also have other properties which provide additional benefits when used in detergent formulations. These aluminosilicates will be referred to as zeolite P in this description.

BACKGROUND OF THE INVENTION

While the utility of zeolite P in detergent formulations has been acknowledged, for example in European Patent Application 0384070 (Unilever), they must be manufactured by a commercially effective process in order to become available on the market place. Thus, while the properties of a material may make it a useful commercial commodity, its manufacture has to be optimised for large scale production. The zeolite P class includes a series of synthetic zeolite phases which may be in cubic configuration (also termed B or $P_c$) or tetragonal configuration (also termed $P_1$) but is not limited to these forms. The structure and characteristics of the zeolite P class are given in "Zeolite Molecular Sieves" of Donald W Breck (published 1974 and 1984 by Robert E Krieger of Florida USA). The zeolite P class has the typical oxide formula:

$$M_{2/n}O \cdot Al_2O_3 \cdot 2.0\text{--}5.00\ SiO_2 \cdot 5H_2O$$

M is an n-valent cation which for this invention is an alkali metal, that is lithium, potassium, sodium, cesium or rubidium with sodium and potassium being preferred and sodium being the cation normally used in commercial processes.

Thus sodium may be present as the major cation with another alkali metal present in a minor proportion to provide a specific benefit.

In EP-A-384,070 is disclosed a process for manufacturing zeolite P having a silicon to aluminium molar ratio not exceeding 1.33 wherein a sodium aluminate solution, having a $Na_2O:Al_2O_3$ molar ratio from 1.4 to 2.0, is mixed with a sodium silicate solution, having a $SiO_2:Na_2O$ molar ratio from 0.8 to 3.4, at a temperature from 25° C. to boiling point and with vigorous stirring to give a gel having the following composition:

$$(2.3\text{--}7.5)\ Na_2O, (1.75\text{--}3.5)\ SiO_2, Al_2O_3, (80\text{--}450)\ H_2O.$$

The gel is then aged for 0.5 to 10 hours at a temperature above 70° C., the crystalline sodium aluminosilicate thus formed being then washed and dried.

This process, with such a gel composition, even though being suitable for producing zeolite P on a bench scale, can't always be directly transposed to industrial scale.

Any industrial process must satisfy a series of requirements. First of all, the dilution must be as low as possible to keep the size of the reactors within satisfactory limits. Therefore the water content of the gel must be as low as possible. Secondly, the gel composition must be as stoichiometric as possible in order to limit reactants consumption. Thirdly, the process must be as simple as possible, i.e the different reactants must be as few as possible and they also must be easy to manipulate.

GENERAL DESCRIPTION OF THE INVENTION

It is an object of the present invention to provide a process for manufacturing an alkali metal aluminosilicate of zeolite P type having the oxide formula $$M_{2/n}O, Al_2O_3, 1.9\text{--}2.6\ SiO_2, y\ H_2O$$

y being the water content, wherein sodium silicate, sodium aluminate and sodium hydroxide are mixed together to produce a first reacting gel having the general formula:

$$2.5\text{--}7.5\ Na_2O, 2.2\text{--}4.0\ SiO_2, Al_2O_3, 60\text{--}250\ H_2O$$

said first reacting gel being then allowed to react sufficiently until zeolite P nuclei are formed, sodium aluminate solution being then added to said first reacting gel, while its degree of crystallinity is below 25%, in a sufficient amount so as to produce a second reacting gel having the general formula:

$$2.3\text{--}7.5\ Na_2O, 1.9\text{--}2.6\ SiO_2, Al_2O_3, 40\text{--}150\ H_2O$$

said second reacting gel being eventually allowed to react, the resulting product being filtered washed and dried.

By doing so, zeolite P seeds are produced in-situ in a first reacting gel with a $SiO_2/Al_2O$ ratio of above 2.2 and it is only after the formation of zeolite P seeds, but before said seeds have the time to fully grow, that sodium aluminate solution is added in order to get a gel which can have a $SiO_2/Al_2O_3$ ratio of about 2 which therefore enables producing a zeolite P having also a $SiO_2/Al_2O_3$ ratio of about 2.

Preferably, the first reacting gel has the general formula:

$$2.5\text{--}7.5\ Na_2O, 2.2\text{--}3.0\ SiO_2, Al_2O_3, 80\text{--}250\ H_2O$$

Preferably, the second reacting gel has the general formula:

$$2.3\text{--}7.5\ Na_2O, 1.9\text{--}2.2\ SiO_2, Al_2O_3, 40\text{--}150\ H_2O$$

and the resulting alkali metal aluminosilicate of zeolite P type has the oxide formula:

$$M_{2/n}O, Al_2O_3, 1.9\text{--}2.1\ SiO_2, y\ H_2O$$

Moreover, and it is also preferable to add sodium aluminate solution to said first reacting gel while its degree of crystallinity is below 15% more preferably below 10%.

It is therefore a second object of the present invention to provide a process for manufacturing an alkali metal aluminosilicate of zeolite P type having the oxide formula $$M_{2/n}O, Al_2O_3, 1.9\text{--}2.1\ SiO_2, y\ H_2O$$

y being the water content, wherein sodium silicate, sodium aluminate and sodium hydroxide are mixed together to produce a first reacting gel having the general formula:

$$2.5\text{--}7.5\ Na_2O, 2.2\text{--}3.0\ SiO_2, Al_2O_3, 60\text{--}250\ H_2O$$

said first reacting gel being then allowed to react sufficiently until zeolite P nuclei are formed, sodium aluminate solution being then added to said first reacting gel, while its degree of crystallinity is below 10%, in a sufficient amount so as to produce a second reacting gel having the general formula:

2.5–7.5 Na$_2$O, 1.9–2.2 SiO$_2$, Al$_2$O$_3$, 40–150 H$_2$O said second reacting gel being eventually allowed to react, the resulting product being filtered washed and dried.

Standard Procedures

In the characterisation of the zeolite-P materials prepared by the present process the following methods were used.

i. Average Particle size (APS): The average particle size (microns) was measured by a Malvern Mastersizer (Trade Mark) obtainable from Malvern Instruments, England and expressed as the d$_{50}$, i.e. 50% by weight of the particles have a diameter smaller than the diameter quoted. The definitions d$_{80}$ and d$_{90}$ may also be used in association with the appropriate figure. Prior to measuring the particle size, the sample is dried as a thin layer (about 1.5 mm) at 110° C. for two hours in a fan oven.

ii. Calcium uptake rate (CUR): The rate of removal of Ca$^{++}$ ions from a wash liquor is an important characteristic of a detergency builder. The time, in seconds, is determined for a zeolite, at a concentration of 1.48 gdm$^3$ and a temperature of 25° C., to reduce the calcium ion concentration in a 0.01M sodium chloride solution from an initial value of 2×10$^{-3}$M to 10$^{-5}$M. The zeolite was first equilibrated to constant weight over saturated sodium chloride solution and the water content measured.

iii. Calcium effective binding capacity (CEBC): The CEBC was measured in the presence of a background electrolyte to provide a realistic indicator of calcium ion uptake in a wash liquor environment. A sample of each zeolite was first equilibrated to constant weight over saturated sodium chloride solution and the water content measured. Each equilibrated sample was dispersed in water (1 cm$^3$) in an amount corresponding to 1 g dm$^{-3}$ (dry), and the resulting dispersion (1 cm$^3$) was injected into a stirred solution, consisting of 0.01M NaCl solution (50 cm$^3$) and 0.05M CaCl$_2$ (3.923 cm$^3$), therefore producing a solution of total volume 54.923 cm$^3$. This corresponded to a concentration of 200 mg CaO per liter, i.e. just greater than the theoretical maximum amount (197 mg) that can be taken up by a zeolite of Si:Al ratio 1.00. The change in Ca$^{2+}$ ion concentration was measured by using a Ca$^{2+}$ ion selective electrode, the final reading being taken after 15 minutes. The temperature was maintained at 25° C. throughout. The Ca$^{2+}$ ion concentration measured was subtracted from the initial concentration, to give the effective calcium binding capacity of the zeolite sample as mg CaO/g zeolite.

iv. The form of the zeolite which was produced was established using standard XRD method.

V. Crystallinity

The crystallinity measurements were made in the following manner.

Firstly x-ray diffraction patterns were measured for a pure phase reference sample of similar chemical composition and each experimental sample. The total area of the five major peaks in each sample was then compared with that of the reference sample. The reference sample was obtained according to Example 11 of EP-A-565364. The diffraction patterns were measured on a Siemens D5000 diffractometer using CuKalpha radiation. The samples were finely ground and compacted in a backfilling sample holder. Data was collected in the region 9 to 37 degrees two Theta using a step size of 0.05 degrees and counting for 6 seconds at each step. The x-ray tube voltage was set at 40 kV and the current at 4 mA.

The recorded diffraction patterns were analyzed using the "Profile Fitting" routine within the Siemens Diffrac-AT v3.0 computer software package. Firstly the scattered x-ray intensity is removed with manual adjustment of the "Curvature" option. Care is taken to minimise the curvature so as not to remove real peak area. Then the peaks to be measured are identified, these have the approximate d-spacings: 7.1; 5.0; 4.1; 3.2 and 2.7 Angstroms. They are fitted to the most suitable mathematical function within the data handling program. In this case the Voigt function was found to best fit all five of the peaks of the reference sample. The same function was used to fit the peaks of the experimental samples. With each peak described mathematically the analysis package is able to calculate the area of each peak. If R is the total area of the peaks of the reference sample, and S the total area of the peaks of the experimental sample then the degree of crystallinity can be expressed as follows:

Degree of Crystallinity=S/R×100

SPECIFIC DESCRIPTION OF THE INVENTION

Examples of processes of the invention will now be given to illustrate but not limit the invention.

EXAMPLE 1

1636g of dilute sodium aluminate solution (4.9% Al$_2$O$_3$, 9.3% Na$_2$O) was placed in a 5-liter baffled flask connected to a reflux condenser. The solution was stirred (500 rpm) and heated to 90° C. 1438 g of dilute sodium silicate solution (8.8% SiO$_2$, 4.3% Na$_2$O) was first preheated to 80° C. and added to the stirred aluminate solution over 15 minutes. The resultant first reaction gel which had a molar oxide composition of:

4.4 Na$_2$O, Al$_2$O$_3$, 2.7 SiO$_2$, 188 H$_2$O was allowed to react for a period of 45 minutes at 90° C. with stirring.

Then, 1034g of dilute sodium aluminate solution (2.74% Al$_2$O$_3$, 6.3% Na$_2$O) preheated at 85° C. was added to the first reaction gel over 15 minutes to give a second reaction gel having the following composition:

4.4 Na$_2$O, Al$_2$O$_3$, 2.0 SiO$_2$, 188 H$_2$O

This second reacting gel was allowed to react at 90° C. with stirring for 5 hours. The resulting product was then filtered, washed and dried.

The resulting product was a zeolite P having an average particle size of 1.1. μm, a CEBC of 162 mg CaO/g zeolite and a CUR of 7 seconds.

EXAMPLE 2

870g of dilute alkaline solution (6.2% Na$_2$O) was placed in a 5-liter baffled flask. The solution was stirred (600 rpm) and heated to 90° C. Preheated (80° C.) 734.5 g of dilute silicate solution (18.5% SiO$_2$, 11% Na$_2$O) and 691 g dilute aluminate solution (12.3% Al$_2$O$_3$, 15.7% Na$_2$O) were added simultaneously to the stirred solution over 15 and 30 minutes respectively.

The resultant first reaction gel which had a molar oxide composition of:

4.7 Na$_2$O, Al$_2$O$_3$, 2.7 SiO$_2$, 120 H$_2$O was allowed to react for a period of 45 minutes with stirring.

Then, preheated (80° C.) 380 g of dilute aluminate solution (8.1% Al$_2$O$_3$, 16.3% Na$_2$O) was added to the stirred reaction mixture over 10 minutes to give a second reaction gel having the following composition:

$$4.7\ Na_2O,\ Al_2O_3,\ 2.0\ SiO_2,\ 100\ H_2O$$

This second reacting gel was allowed to react at 90° C. with stirring for 5 hours. The resulting product was then filtered, washed and dried.

The resulting product was a zeolite P having an average particle size of 0.8 μm, a CEBC of 165 mg CaO/g zeolite and a CUR of 6 seconds.

I claim:

1. Process for manufacturing an alkali metal aluminosilicate of zeolite P type having the oxide formula $$M_{2/n}O,\ Al_2O_3,\ 1.9\text{--}2.6\ SiO_2,\ y\ H_2O$$

y being the water content, wherein sodium silicate, sodium aluminate and sodium hydroxide are mixed together to produce a first reacting gel having the general formula:

$$2.5\text{--}7.5\ Na_2O,\ 2.2\text{--}4.0\ SiO_2,\ Al_2O_3,\ 60\text{--}250\ H_2O$$

said first reacting gel being then allowed to react sufficiently until zeolite P nuclei are formed, sodium aluminate solution being then added to said first reacting gel, while its degree of crystallinity is below 25%, in a sufficient amount so as to produce a second reacting gel having the general formula:

$$2.3\text{--}7.5\ Na_2O,\ 1.9\text{--}2.6\ SiO_2,\ Al_2O_3,\ 40\text{--}150\ H_2O$$

said second reacting gel being allowed to react to provide said alkali metal aluminosilicate of zeolite P type having the indicated oxide formula, the resulting product being filtered washed and dried.

2. Process according to claim 1 for manufacturing an alkali metal aluminosilicate of zeolite P type having the oxide formula $$M_{2/n},\ Al_2O_3,\ 1.9\text{--}2.1\ SiO_2,\ y\ H_2O$$

y being the water content, wherein sodium silicate, sodium aluminate and sodium hydroxide are mixed together to produce a first reacting gel having the general formula:

$$2.5\text{--}7.5\ Na_2O,\ 2.2\text{--}3.0\ SiO_2,\ Al_2O_3,\ 60\text{--}250\ H_2O$$

said first reacting gel being then allowed to react sufficiently until zeolite P nuclei are formed, sodium aluminate solution being then added to said first reacting gel, while its degree of crystallinity is below 10%, in a sufficient amount so as to produce a second reacting gel having the general formula:

$$2.5\text{--}7.5\ Na_2O,\ 1.9\text{--}2.2\ SiO_2,\ Al_2O_3,\ 40\text{--}150\ H_2O$$

said second reacting gel being allowed to react to provide said alkali metal aluminosilicate of zeolite P type having the indicated oxide formula, the resulting product being filtered washed and dried.

* * * * *